United States Patent [19]
Pettinaroli

[11] Patent Number: 5,188,335
[45] Date of Patent: Feb. 23, 1993

[54] BALL VALVE WITH LOCKABLE SECURITY DEVICE

[75] Inventor: Giuseppe Pettinaroli, Novara, Italy

[73] Assignee: Fratelli Pettinaroli S.p.A., Italy

[21] Appl. No.: 893,312

[22] Filed: Jun. 2, 1992

[51] Int. Cl.5 .......................................... F16K 35/06
[52] U.S. Cl. ............................... 251/95; 70/177;
70/180; 70/212; 137/315; 137/385; 137/550;
251/104; 251/110; 251/288; 251/315
[58] Field of Search ............... 70/175, 176, 177, 180,
70/212; 137/550, 385, 315; 251/95, 96, 98, 99,
102, 104, 105, 106, 110, 297, 315, 316, 286, 287, 288

[56] References Cited

U.S. PATENT DOCUMENTS

| | | | |
|---|---|---|---|
| 664,462 | 12/1900 | Campbell | 137/385 |
| 917,408 | 4/1909 | Booz | 251/96 |
| 932,188 | 8/1909 | Strelezky | 251/99 |
| 983,842 | 2/1911 | Schneible | 137/385 |
| 1,089,098 | 3/1914 | Winkler | 251/96 |
| 1,801,175 | 4/1931 | Possons | 251/96 |
| 2,678,186 | 5/1954 | Blackford | 251/105 |
| 4,078,763 | 3/1978 | Yamamoto | 251/96 |
| 4,848,724 | 7/1989 | Pettinaroli | 251/95 |
| 5,058,622 | 10/1991 | Chitty, Jr. et al. | 251/95 |

*Primary Examiner*—George L. Walton
*Attorney, Agent, or Firm*—Robert G. Mentag

[57] ABSTRACT

A ball valve comprising a body including a valve chamber having inlet and outlet ports, and a rotatable ball element disposed within the valve chamber, the ball element having a conduit therethrough which communicates with the inlet and outlet ports. The ball element is movable by a control lever between an open position and a closed position. The valve is provided with a lockable security device which automatically locks the ball element in a positive closed position when the control lever moves the ball element from an open position to a closed position. The lockable security device includes a rotatable cylinder, a locking cylinder slidably mounted on the rotatable cylinder, a supplemental locking member to selectively allow manual locking of the locking cylinder in a position to prevent sliding movement of the locking cylinder on the rotatable cylinder.

5 Claims, 5 Drawing Sheets

BALL VALVE WITH LOCKABLE SECURITY DEVICE

BACKGROUND OF THE INVENTION

1. Field of the Invention

The field of art to which this invention pertains may be generally located in the class of devices relating to valves. Class 151, Valves and Valve Actuation, United States Patent Office Classification, appears to be the applicable general area of art to which the subject matter similar to this invention has been classified in the past.

2. Description of the Prior Art

This invention relates generally to ball valves, and in particular to a cut-off ball valve provided with a lockable security device. The lockable security device is operatively connected to the ball element of the valve to prevent undesired rotation of the ball element, and to automatically lock the ball element in the closed position of the valve when the ball element is turned to said closed position.

The ball valve of the present invention, with its lockable security device is adapted for use in water and heating systems, and it may be operated quickly at high pressures.

A problem commonly encountered in the use of ball valves for controlling the flow of a fluid is the difficulty of ensuring that the valve ball element is in the closed position, so as to avoid accidental or unintentional operations of the valve, which can change the pre-set or desired operative condition of the valve. U.S. Pat. No. 4,848,724 discloses a ball valve with a control lever locking mechanism wherein a manually operable lock is provided to retain the control lever and the ball element in a fully open position, a fully closed position, or in at least one intermediate operative position between the fully open and fully closed positions. A disadvantage with the ball valve control lever locking mechanism disclosed in the last mentioned patent is that it includes a ring shaped element which is adapted to engage stop members or protrusions on the valve body, to hold the control lever in a selected position, and it must be manually moved to a locking position when the valve control lever is moved to a fully closed position. The ring shaped element is difficult to manipulate when the control lever is moved from a fully open position to a fully closed position and vice versa. Another disadvantage of the control lever locking mechanism disclosed in the last mentioned patent is that two hands of the operator are required while moving the control lever to make sure that a correct adjusted position is obtained. One hand of a user is required to move the ring shaped element while the other hand is required to rotate the control lever, and such a two-handed operation can result in misplacing the control lever in an erroneous position.

It is a primary object of the present invention to provide a novel, lockable security device for a ball valve which overcomes the aforementioned problem and disadvantages of the ball valve control lever locking mechanism set forth above.

It is another object of the present invention to provide a ball valve with a lockable security device which automatically locks the ball valve control lever in a fully closed position when the lever is rotated to that position.

It is a further object of the present invention to provide a ball valve with a lockable security device which may include a supplementary locking means when the valve control lever is in a fully closed position.

SUMMARY OF THE INVENTION

The aforegoing objects are accomplished by providing a ball valve having a body which includes a valve chamber, inlet and outlet ports communicating with the valve chamber and a rotatable valve ball element rotatably mounted in a valve chamber in the valve body. The valve ball element is provided with a conduit formed therethrough. A control lever is operatively mounted on the valve body and it is connected to the ball element for rotating the ball element between a fully open position and a fully closed position. The conduit through the ball element communicates with the fluid inlet and outlet ports.

The control lever is connected to the outer end of a rotatable shaft for the ball element, and the control lever is provided with a downwardly depending lip at the end thereof which engages stop protrusions on the valve body, when the control lever is in the open and closed positions of the ball element. The lockable security device of the invention includes a locking means which is spring operated to automatically lock the control lever and the ball element in a closed position. The locking means is manually movable in a longitudinal upward direction when the control lever is in the locked closed position, so as to release the control lever and permit it to be moved to a fully open position, or to a selected operative position between a fully open position and a fully closed position. The lockable security device is constructed and arranged to allow a supplemental lock member to be attached thereto, to lock the control lever in the fully closed position. The locking means comprises a locking cylinder which is downwardly biased by a spring means, and which has a downwardly depending cylindrical wall portion. The cylindrical wall portion has a downwardly curved lower edge that terminates in a cut-out portion at the lower edge of the locking cylinder, to form a longitudinally disposed stop finger that engages a stop protrusion on the valve body when the control lever is rotated to a fully closed position, and the locking cylinder is biased downwardly by said spring means.

The locking cylinder is slidably supported for axial movement on a bush member, which is freely rotatable, and coaxially arranged with the ball element shaft. A return spring means is operatively mounted between the locking cylinder and the bush member, to normally maintain a downward bias on the locking cylinder, and to move the locking cylinder member into a locked position with a stop protrusion on the valve body when the control lever is moved to a fully closed position.

The ball valve of the present invention provides a quick cut-off ball valve which may be placed and maintained in a fluid flow circuit in a locked closed position, so that the position of the valve control lever cannot be changed accidentally from a closed position.

DETAILED DESCRIPTION OF THE PREFERRED EMBODIMENT

Figure 1:
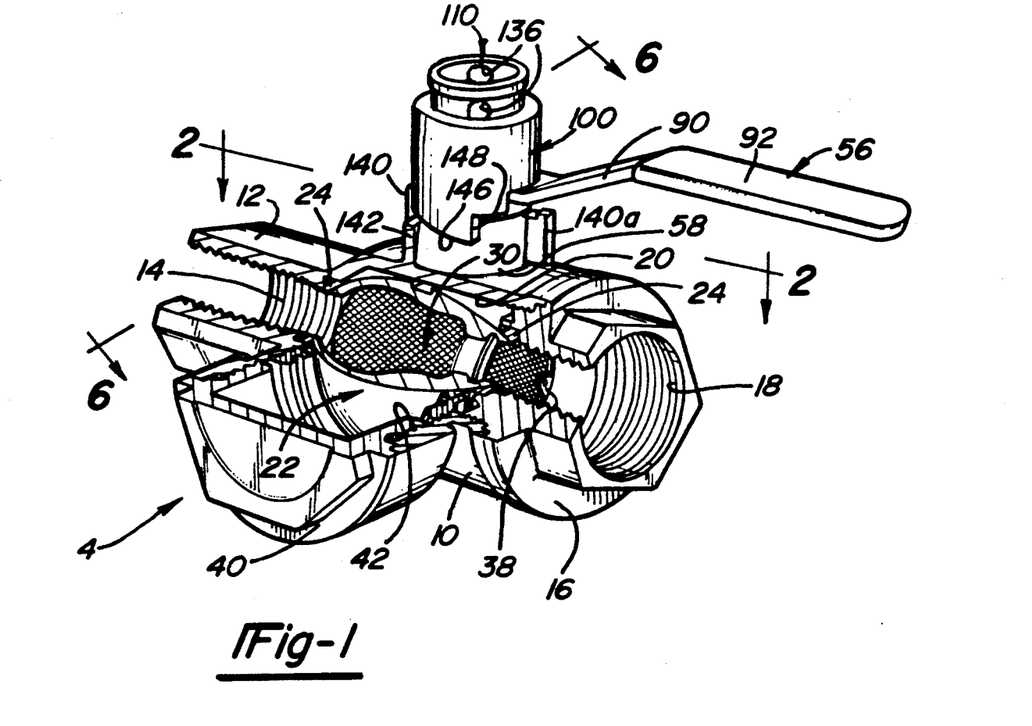
FIG. 1 is an elevation perspective view, with parts broken away and parts in section, and showing a ball valve embodying the invention.

Referring now to the drawings, and in particular to FIG. 1, the ball valve according to this invention comprises a hollow valve body 10 provided with an integral outlet pipe fitting or nipple 12 defining an outlet port 14 which communicates with a ball valve chamber 20 formed in the hollow valve body 10. An inlet pipe fitting or nipple 16 is threadably mounted in the valve body 10, in a position axially aligned with the integral outlet pipe fitting or nipple 12, and it defines an inlet port 18.

Figure 7:
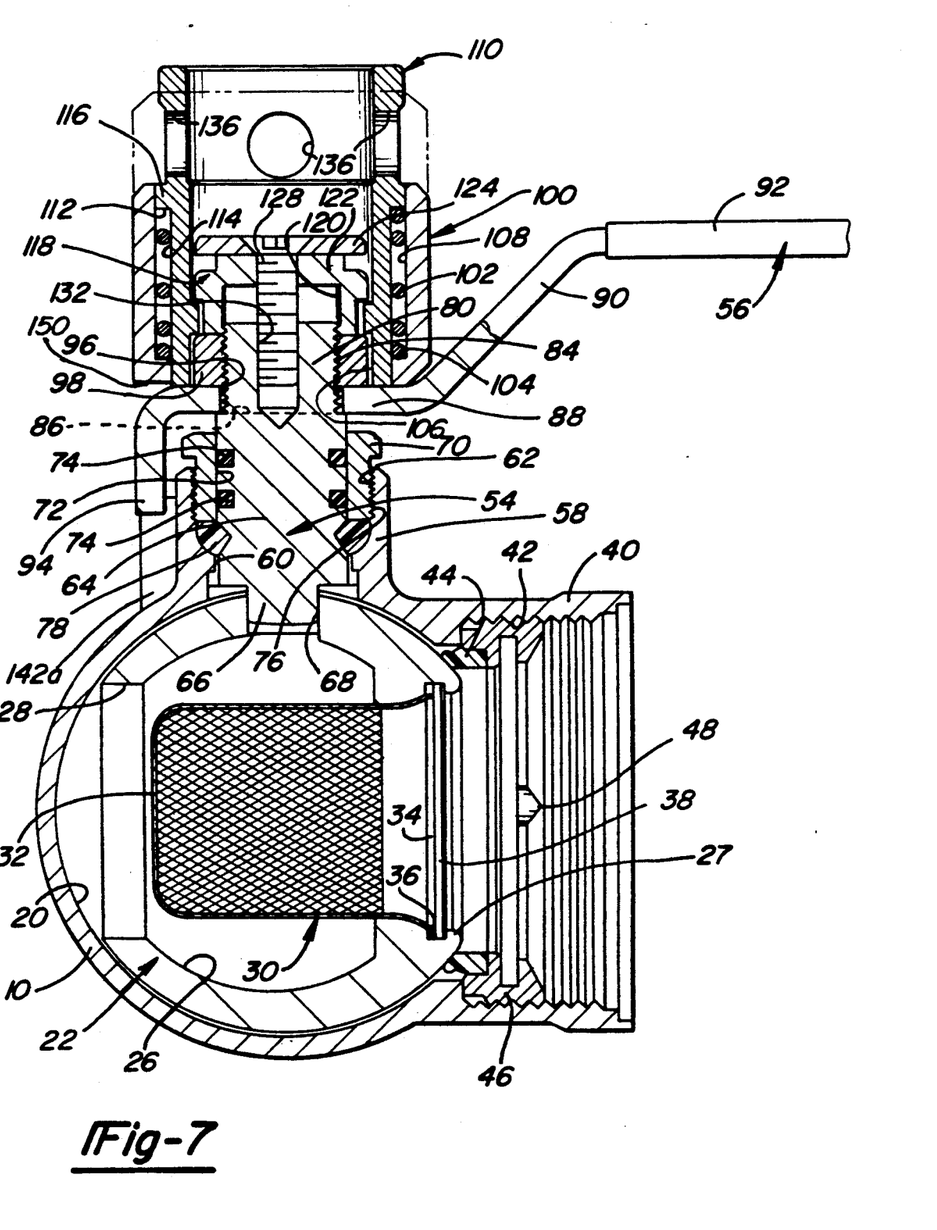
FIG. 7 is an elevation section view, similar to the elevation section view of FIG. 6, but with the valve in a closed position, the filter inspection cap removed, and the valve lever moved to a closed position of the valve.

A rotatable ball or closing element, generally indicated by the numeral 22, is rotatably disposed inside of the valve chamber 20 in the valve body 10. The ball element 22 is rotatably supported by a pair of annular seating and sealing members indicated by the numeral 24 in FIG. 1. As shown in FIG. 7, the ball element 22 has an internal chamber 26 which has an inlet opening 27 and an outlet opening 28 to provide a flow passage through the ball element 22.

As best seen in FIG. 1, a filter basket, generally indicated by the numeral 30, is positioned in the ball element chamber 26 in a valve open position, and it is positioned with an inlet end 34 (FIG. 7) facing the inlet port 18. As best seen in FIG. 7 the filter basket 30 has a discharge outlet end 32 and an inlet end 34 with an enlarged rim which is seated in an annular groove 36 formed around the inlet 27 of the ball element 22. A suitable retainer clip ring 38 is also releasably mounted in groove 36 and retains the filter basket 30 in its operative position in the ball element 22.

Figure 6:
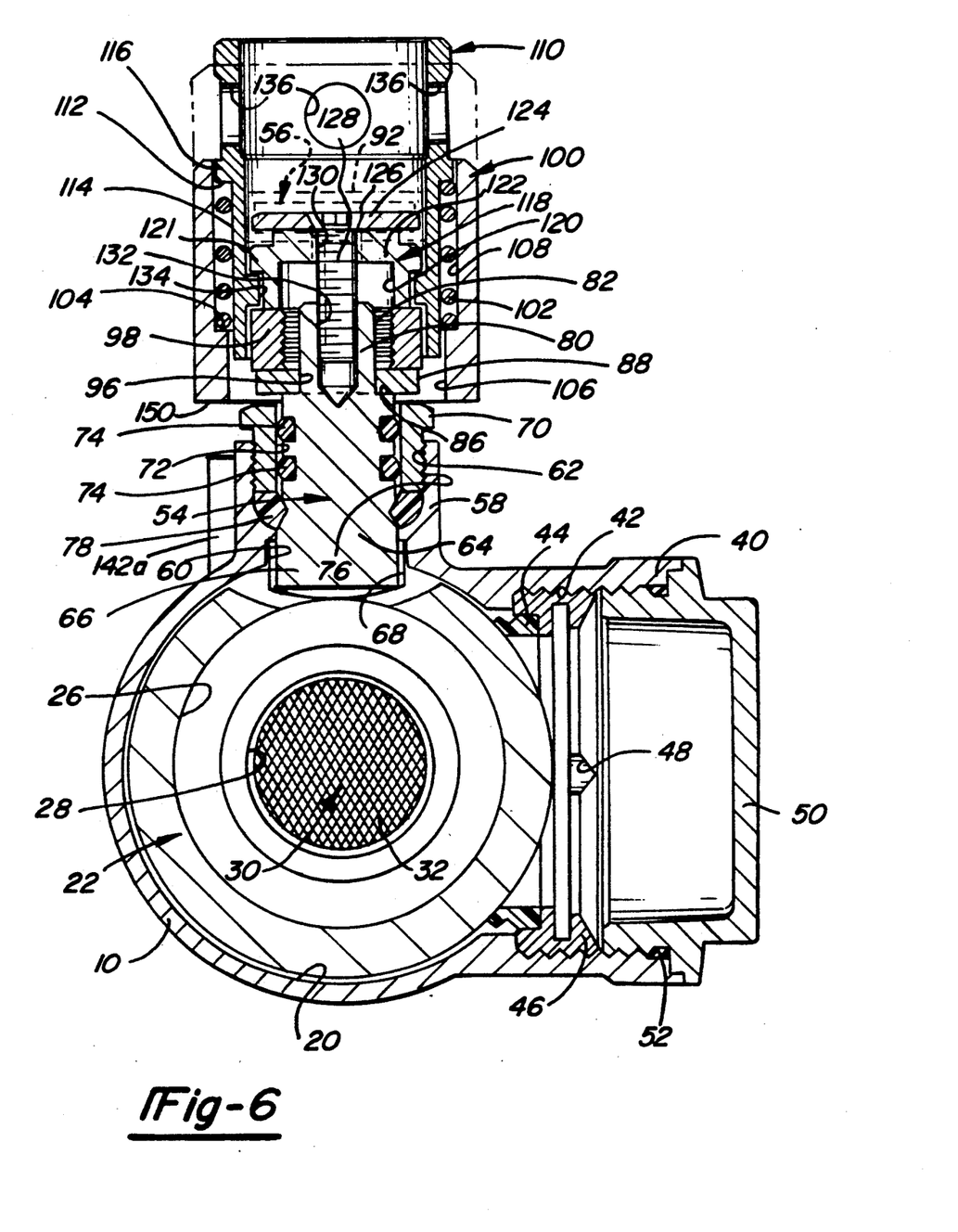
FIG. 6 is an elevation section view of the valve structure illustrated in FIG. 1, taken along the line 6—6 thereof, looking in the direction of the arrows, and showing the valve in an open position.

As shown in FIG. 6, the ball valve is provided with an integral, annular filter inspection chamber body 40 which communicates with the ball element chamber 20 through a threaded cylindrical opening 42. As shown in FIG. 7, a safety seat 44 is operatively engaged with the peripheral surface of the ball element 22, and it also functions as a sealing member. The safety seat 44 is carried in a safety lock nut 46 which is threadably mounted in the inner end of the threaded bore 42 in the filter inspection chamber 40. The numeral 48 designates a notched out portion in the inner periphery of the safety lock nut 46 for the reception of a suitable wrench for rotating the safety lock nut 46 to seat it in its operative position in the filter inspection chamber 40. As shown in FIG. 6, the filter inspection chamber 40 is enclosed by a filter inspection chamber cap 50 which is threadably mounted in the outer end of the threaded bore 42 in the filter inspection chamber body 40. A suitable O-ring 52 is mounted around the outer end of the threaded bore 42, between the filter inspection chamber 40 and the inspection cap 50. The integral filter inspection chamber 40 is disposed on an axis perpendicular to the longitudinal axis of the ball element chamber 20.

As shown in FIGS. 1, 6 and 7, the basket filter 30 has a flat outlet wall 32 and a cylindrical side wall whose external diameter is smaller than the internal diameter of the axial passage 26 in the ball element 22, so as to create an annular chamber around the basket filter 30. The basket filter 30 can be removed and replaced through the inspection chamber 40. The remover of the basket filter 30 and replacement of the same can be effected by removing the inspection cap 50 and removing the safety lock nut 46 and removing the retainer clip ring member 38. The filter member 30 can be replaced back in the ball element 22 after an inspection by reversing the aforedescribed procedure.

Figure 4:
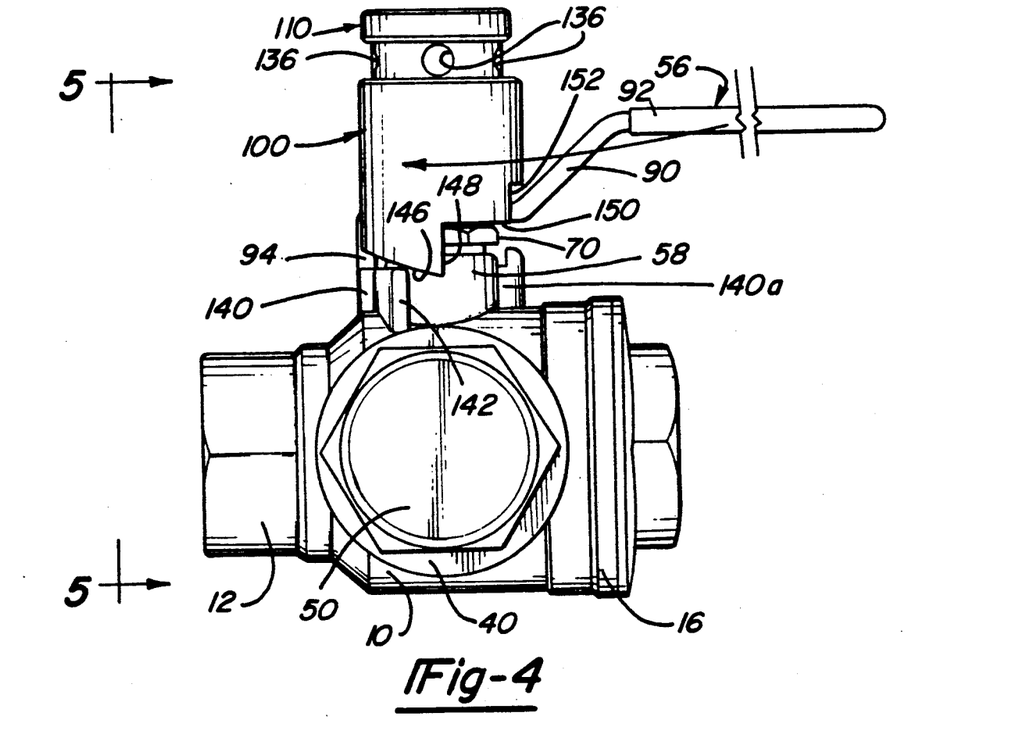
FIG. 4 is a side elevation view of the valve structure illustrated in FIG. 1, taken in the direction of the arrow marked "4" in FIG. 1, and showing the valve lever in an open position.
Figure 5:
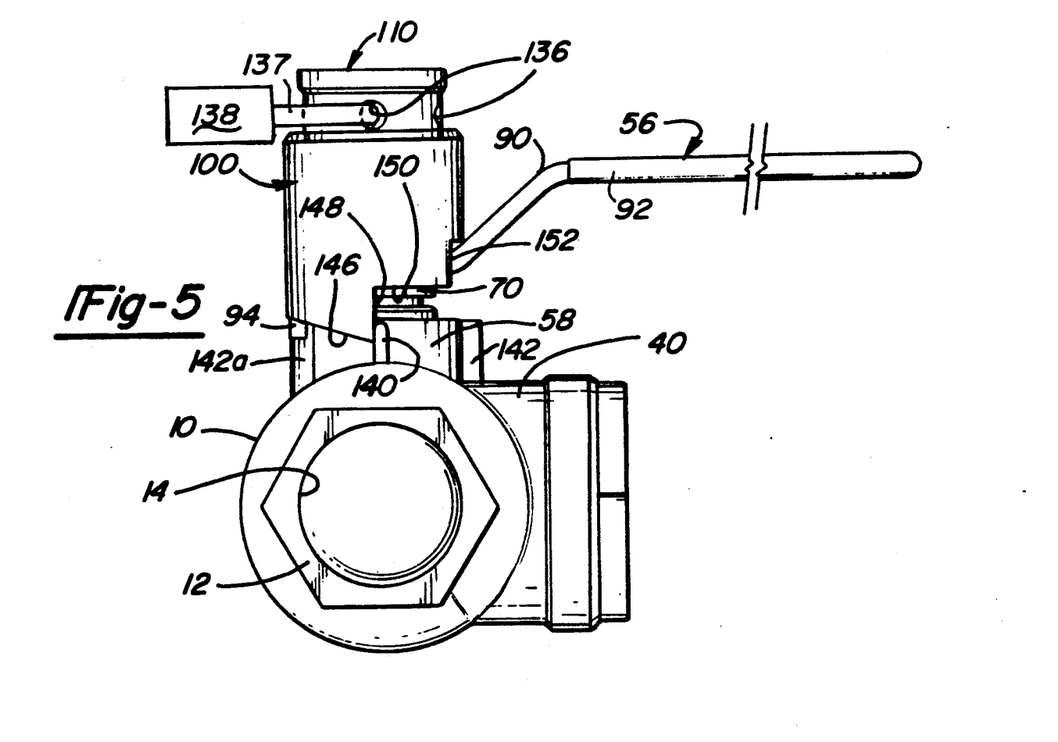
FIG. 5 is an end elevation view of the valve structure illustrated in FIG. 4, taken along the line 5—5 thereof, looking in the direction of the arrows, and showing the valve lever moved to a closed position of the valve.

The ball element 22 of the valve is operatively connected, by means of a shaft, generally indicated by the numeral 54, to a control lever, generally indicated by the numeral 56. The ball element 22 can be rotated by the control lever 56 between two operative conditions, one where the valve is completely closed as shown in FIG. 5 and 7, in which the axial passage 26 through the ball member 22 is perpendicular to the axis of the chamber or passage 26 and perpendicular to the axis of the ball chamber 20, and a completely open position as shown in FIGS. 1 and 4, in which the axial passage 26 through the ball element 22 is aligned with and connected to the outlet and inlet ports 14 and 18, respectively.

As best seen in FIG. 6, the valve body 10 is provided with a cylindrical hub portion 58 which has a threaded bore in the upper end thereof, that communicates with a stepped bore 62 formed at the lower end thereof, and which communicates with the valve body chamber 20. As shown in FIGS. 6 and 7, the intermediate end 64 of the shaft 54 is integral with a lower end 66 that is rectangular in cross section and is adapted to be seated in the rectangular slot 68 formed in the upper side of the ball element 22 to provide a driving connection between the shaft 54 and the ball element 22.

As shown in FIGS. 6 and 7 shaft 54 is rotatably supported in the hub portion 58 of the valve body 10 by means of a cylindrical gland 70 which is provided with an axial bore 72 in which the shaft intermediate portion 64 is rotatably mounted. A pair of suitable O-ring seals 74 are mounted in a pair of peripheral grooves formed in the periphery of the shaft intermediate portion 64, and they sealingly engage the adjacent surface of the axial bore 72 in the gland 70. The gland 70 is provided with an outer threaded periphery 76 which is threadably seated in the threaded bore 62 of the valve body hub portion 58. A packing ring 78 is mounted in a peripheral groove formed around the lower shaft intermediate portion 64. The upper end of the packing ring 78 is engaged by the lower end of the gland 70 and it also seats in the upper concave peripheral portion of the stepped bore 60 formed in the lower end of the hub portion 58 of the valve body 10. The gland 70 exerts a downward pressure through the packing ring 78 on the shaft 54 to maintain an operative engagement with the ball element 22.

Figure 2:
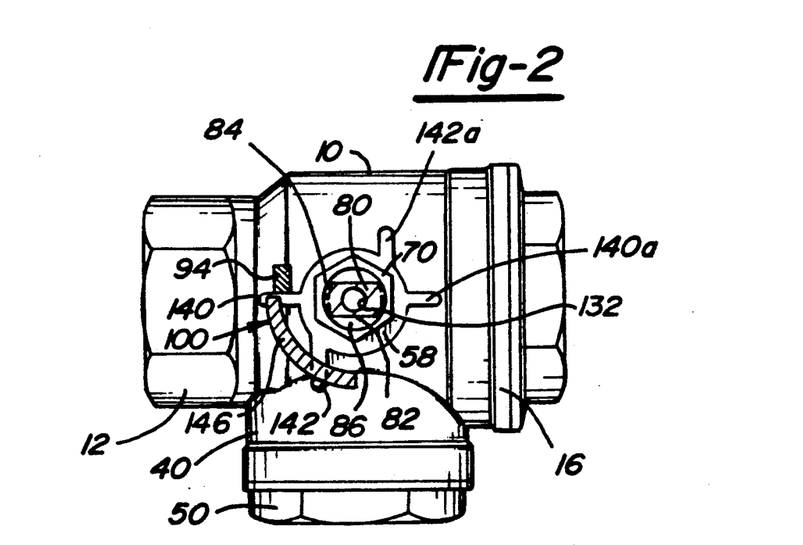
FIG. 2 is a horizontal view of the ball valve structure illustrated in FIG. 1, partly in section, taken along the line 2—2 thereof, and looking in the direction of the arrows.
Figure 3:
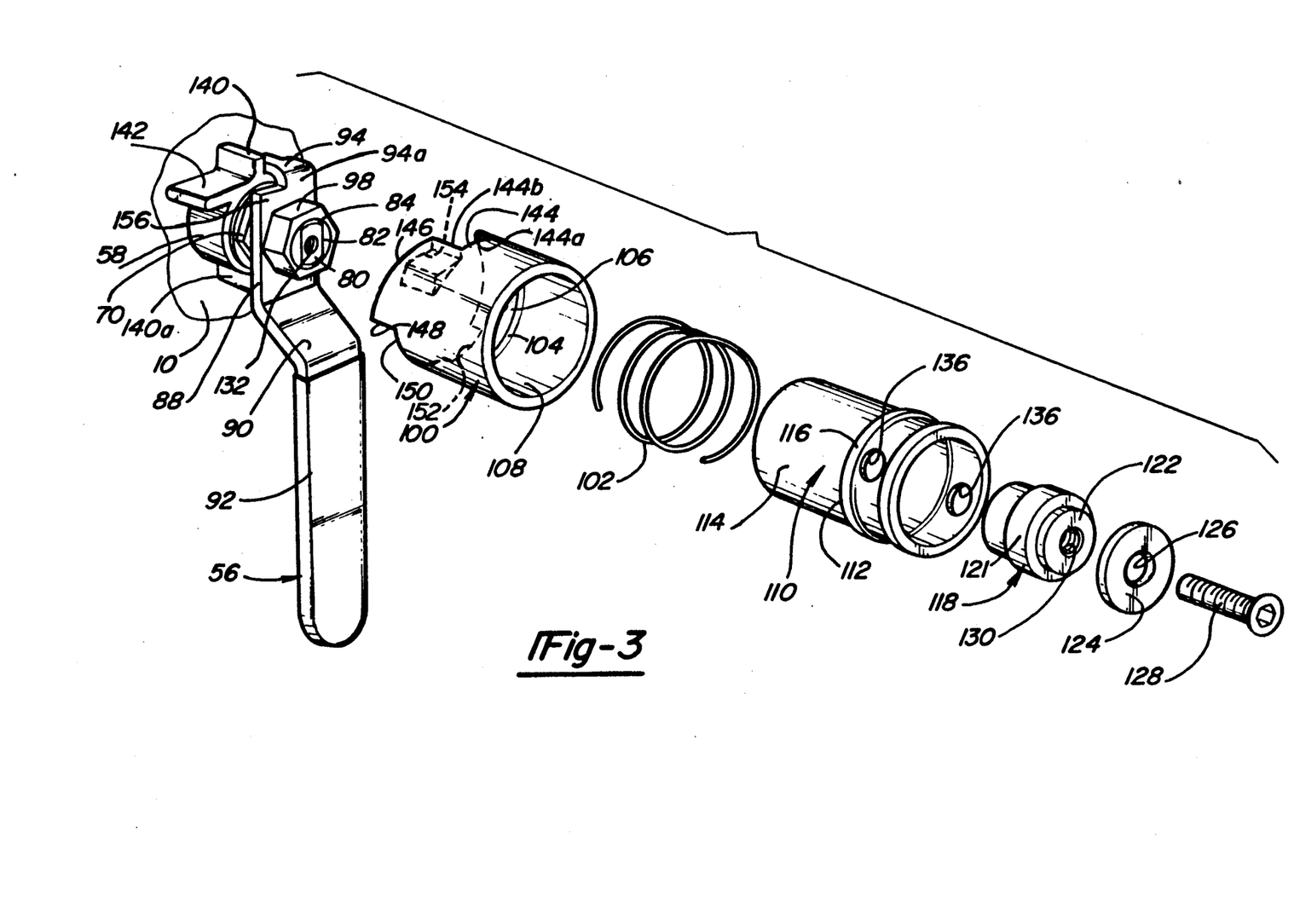
FIG. 3 is an exploded view of the automatic safety means for locking the valve lever in a closed position.

As shown in FIGS. 3 and 7, the control lever 56 is mounted on the threaded upper end 80 of the shaft 54. As shown in FIGS. 3 and 6, the shaft upper end 80 is substantially rectangular in cross section and has two flat long sides 82 and two threaded shorter ends 84. As best seen in FIGS. 2 and 6, the upper end of the shaft intermediate portion 64 forms a pair of flat seats 86 at the junction point with the two flat, long sides 82 of the shaft upper end 80. The control lever 56 includes a portion 92 which is integrally connected to a shaft engaging outer end portion 88, by an upwardly and outwardly angled intermediate portion 90 of the control lever 56. An integral lip 94 is formed on the upper end of the shaft engaging lever portion 88, and it protrudes downwardly in a direction perpendicular to the horizontal axis of the lever portion 88, as viewed in FIG. 7. The numeral 96 in FIGS. 6 and 7 designate a rectangular opening formed through the lever portion 88 to permit the lever portion 88 to be mounted over the threaded upper end 80 of the shaft 54 and to be seated on the two flat seats 86 formed on each side of the shaft threaded upper end 80. The lever portion 88 is releasably secured to the shaft 54 by an hexagonal nut 98, which is threadably mounted on the shaft threaded upper end 80 and seats against the upper side of the lever portion 88, and forces it downwardly into a gripping and seating engagement with the two flat seats 86 on the intermediate shaft portion 64.

As shown in FIGS. 3 and 6, the lockable security device includes a locking cylinder, generally indicated by the numeral 100. A return spring 102 is mounted within an upper chamber 108 in the locking cylinder 100, and the lower end thereof is seated on a shoulder or seat 104 which is formed at the junction point between said upper chamber 108 and a lower, smaller diameter chamber 106. A lockable rotatable cylinder, generally indicated by the numeral 110, is slidably and telescopically mounted in the locking cylinder 100 from the upper end thereof. The rotatable cylinder 110 is provided with an annular, outwardly protruding shoulder or flange 116, adjacent the upper end thereof. The lower side of the flange 116 forms a shoulder or spring seat 112 at the junction point between a lower cylindrical outer surface 114 (FIG. 7) of the rotatable cylinder 110. As shown in FIGS. 6 and 7, the return spring 102 is seated in the space between the cylinder upper chamber 108 in the locking cylinder 100 and the outer periphery 114 of the rotatable cylinder 110. The lower end of the return spring 102 seats on the locking cylinder shoulder or springs seat 104. The upper end of the return spring 102 seats against the shoulder or spring seat 112 formed on the rotatable cylinder 110. The return spring 102 maintains a downward bias on the locking cylinder 100.

The locking cylinder 100 and the rotatable cylinder 110 are operatively attached to the ball valve shaft 54 by the following described structure.

As shown in FIGS. 3 and 6, a cylindrical retainer member, generally indicated by the numeral 118, operatively retains the locking cylinder 100 and the rotatable cylinder 110 on the ball valve shaft 54. As shown in FIG. 6, the lower end of the retainer member 118 seats on the hexagonal nut 98. The retainer member 118 has a cylindrical recess 120 formed in the lower end thereof. The upper end 80 of the ball valve shaft 54 extends slightly into the recess 120 in the retainer member 118. The retainer member 118 is provided with an integral, peripheral flange 121, in a position spaced upwardly from the lower end thereof. The numeral 122 indicates the closed upper end of the retainer member 118 on which seated a washer 124. As best seen in FIG. 3, the washer 124 has an axial hole 126 formed therethrough, through which is mounted a retainer screw 128. As shown in FIG. 6, the retainer screw 128 is mounted through the washer hole 126 and into threaded engagement in a threaded hole 130, formed axially through the closed upper end 122 of the retainer member 118. The retainer screw 128 also extends through the retainer member recess 120 and into threaded engagement with the axial threaded hole 132 formed in the upper end 80 of the ball valve shaft 54.

As shown in FIG. 6, the rotatable cylinder 110 is provided with an internal peripheral flange 134 which extends radially inward and is positioned under the annular flange 121 formed on the outer periphery of the retainer member 118. It will be seen, that the return spring 102 normally biases the rotatable cylinder 110 in an upward direction, so as to bring the upper side of the internal peripheral flange 134 into seating engagement on the lower shoulder of the peripheral flanges 121 on the retainer member 118. The rotatable cylinder 110 is freely rotatable in the last described structural arrangement, since the upper side of the internal flange 134 can be slide on the underface of the external peripheral flange 121 on the retainer member 118. The rotatable cylinder 110 may also be termed a bush.

As best seen in FIGS. 1, 3 and 6, the rotatable cylinder 110 is provided with a plurality of circular lock holes 136, adjacent the upper end thereof, which are positioned above the upper end of the locking cylinder 100. As shown in FIG. 1, a suitable, supplementary lock member may be inserted through an oppositely disposed pair of the circular lock holes 136. The numeral 137 designates the hasp member of a suitable padlock 138 mounted through a pair of said lock holes 136. The inserting of a suitable supplementary locking member through a pair of oppositely disposed lock holes 136 restricts the upward sliding movement of the locking cylinder 100 so as to restrict any upward movement of the same to permit rotation of the control lever 56. Any other equivalent locking means may be used, instead of a such as padlock 138, so as to ensure that the locking cylinder 100 may not be moved on to allow unintentional movement of the control lever 56.

It is best seen in FIG. 2, that the valve hub 58 has integrally formed thereon an integral stop protrusion 140 against which the downwardly protruding lip 94, on the control lever 56, engages when the control lever 56 is in the valve open position. The numeral 142a designates an integral stop protrusion on the valve body hub 58 which is engaged by the control lever downwardly extended lip 94 when the control lever 56 is in the valve closed position shown in FIG. 7. As shown in FIG. 2, the valve of the present invention is provided with a second integral valve open stop protrusion 140a and a second valve integral closed stop protrusion 142. The last two mentioned stop protrusions would be employed if the locking cylinder 100, the lockable rotatable cylinder 110 and the control lever 56 were mounted 180 degrees from the position shown in FIG. 1, so as to provide a left handed valve instead of a right handed valve.

As shown in FIG. 3, the locking cylinder 100 is provided with a rectangular slot 144, on what maybe termed the front end of the locking cylinder 100 when it is mounted on the control lever 56 and in an operative position on the valve shaft 54. The upper end 94a of the lip 94 is adapted to be seated in the slot 144. As best seen in FIG. 3, the lower edge of the locking cylinder 100 extends around to the back of the locking cylinder 100, from one end 144a of the slot 144, on a peripheral plane which is perpendicular to the longitudinal axis of the locking cylinder 100 to a point where a second upwardly extending slot 152 is formed for the sliding reception of the lower end of the control lever intermediate portion 90. As shown in FIG. 5, the lower end 150 of the locking cylinder 100 extends on the same plane perpendicular to the longitudinal axis of the locking cylinder 100 in a clockwise direction to a downwardly extended, longitudinal stop finger 148. The stop finger 148. extends longitudinally downward from the lower end surface 150 of the locking cylinder 100 and terminates at an upwardly sloping or angled cam surface 146. The cam surface 146 continues on an upwardly sloping angle clockwise around to the other edge 144b of the slot 144.

as shown in FIG. 3, a right angled recess 154 is formed on the inner surface of the downwardly projected lower end wall portion on the locking cylinder 100 which carries the angled cam surface 146. The left hand corner 156 of the control lever end portion 88 is adapted to be slidably mounted in the right angled recess 154 for guiding the longitudinal sliding movement of the locking cylinder 100 relative to the rotatable cylinder 110. It will be seen that the locking cylinder 100 may be moved longitudinally relative to the rotatable cylinder 110, against the pressure of the return spring 102, but it is restrained against rotational movement relative to the control lever 56 by the action of the lever corner 156 longitudinally sliding in the right angled slot 154 in the locking cylinder 100.

It will be seen from the aforegoing, that the locking cylinder 100 is connected to the control lever 56 to rotate with it so as to maintain the same annular relation with respect to the control lever 56 while allowing a longitudinal sliding movement of the locking cylinder 100 due to the interconnection of the corner 156 at the front edge of the lever 56 being slidably mounted in the longitudinal right angle slot 154 in the inner wall of the locking cylinder 100.

The use of the ball valve of the present invention and the operation of the lockable security device will be seen from the following description. Assuming that the ball valve 22 in the open position shown in FIG. 1, the downwardly protruding lip 94 on the outer end of the control lever 56 would be in a position against the stop protrusion 140, as shown in FIGS. 2 and 3. In this position the return spring 102 biases the locking cylinder 100 downwardly so that the front and rear portions of the control lever 56 are seated in the slots 144 and 152 respectively, in the lower end of the locking cylinder 100. In the valve open position, the lower edge of the locking cylinder 100 which has the sloping cam surface 146 formed thereon in positioned, as shown in FIGS. 1, 2 and 4 over and in sliding engagement with the upper side of the stop protrusion 142.

When the control lever 56 is moved clockwise, the cam edge 146 on the locking cylinder 100 slides on the top of the stop protrusion 142 and when the control lever 56 has been turned 90 degrees from the valve open position shown in FIG. 1, to the valve closed position shown in FIG. 5, the locking cylinder cam edge 146 will have slid over the stop protrusions 142 and 140, and the return spring 102 will bias the locking cylinder 100 downwardly, so that the axially disposed stop finger 148 on the locking cylinder 100 will engage the side of the stop protrusion 140 which is annularly spaced from the adjacent side of the stop protrusion 142a. The control lever lip 94 engages the said adjacent side of the stop protrusion 142a. Accordingly, it will be seen that the control lever 56 is than in an automatic locked position because of the last described engagement of the lever lip 94 engaging one side of the stop protrusion 142a and the longitudinally disposed stop finger 148 on the locking cylinder 100 engaging the adjacent facing vertical surface on the stop protrusion 140. The control lever 56 is thus in a positive, automatic, safety locked position, and in order to move it back to a valve open position the locking cylinder 100 must be manually lifted upwardly against the pressure of the return spring 102 so as to permit the control lever 56 to be turned counterclockwise, and to have the longitudinally disposed stop finger 148 on the locking cylinder 100 clear or pass over the stop protrusion 140 and allow the control lever 56 to be returned to the valve open position shown in FIG. 1.

The control lever 56 may be locked in the last described valve closed position by inserting a hasp 137 of a padlock 138 through a pair of the lock holes 136. Under such a condition the locking cylinder 100 may not be manually moved upwardly, and the control lever 56 is locked in the valve closed position shown in FIG. 5.

The lock holes 136 may be positioned in the rotatable cylinder 110 in a longitudinal location so that a supplementary locking member may be mounted in the lock holes 136, to prevent the locking cylinder 100 from moving upwardly to permit the cam surface 146 to clear or move over the stop protrusion 142 (FIG. 4), and thus lock control lever 56 in the valve open position.

What is claimed is:

1. A ball valve comprising a body (10) having a valve chamber (20), inlet (18) and outlet (14) ports communicating with said valve chamber (20), a rotatable ball element (22) disposed within the valve chamber (20), said ball element (22) including means (26,27,28) defining a conduit therethrough, said ball element (22) having a rotatable shaft (54) for rotating the ball element (22) between a valve open position and a valve closed position, a control lever (56) being connected to the ball element (22) rotatable shaft (54), said control lever (56) having a downwardly depending lip (94) at the end thereof for engaging first and second stop protrusions (140,142a) integrally formed on the valve body (10), when the ball element (22) is in said open and closed positions respectively, characterized by:
   (a) a rotatable cylinder (110) being rotatably mounted on the ball element shaft (54) and having an upper end;
   (b) a retainer member (118) releasably securing said rotatable cylinder (110) to said ball element (54);
   (c) each of said stop protrusions (140,142a) extending upwardly from the valve body and having a top end;
   (d) a locking cylinder (100) having a lower end surface (146) and being telescopically mounted on said rotatable cylinder (110) and being manually slidable longitudinally on said rotatable cylinder (110) and slightly rotatable so as to permit the lower end surface (146) of the locking cylinder (100) to slidably engage the top end surface of said first stop protrusion (140), and interconnected with said control lever (56) to restrict rotational movement of the locking cylinder (100) relative to the rotatable cylinder (110) while allowing slidable longitudinal movement of the locking cylinder (100) relative to the rotatable cylinder; and, (e) a spring means (102) having one end engaged with the locking cylinder (100) and the other end engaged with the rotatable cylinder (110) to maintain a constant longitudinal bias on the locking cylinder (100) relative to the rotatable cylinder (110) to slide the locking cylinder (100) downward longitudinally from a raised position, when the locking cylinder (100) is in a valve open position and the control lever (56) is aligned with and seated in slot means (144,152) in the locking cylinder (100), and into a positive locking engagement with said first stop protrusion (140) on the valve body (10) when the control lever (56) is moved from a valve open position to a valve closed position to lock the control lever (56) and the ball element (22) in non-rotative positions.

2. A ball valve as defined in claim 1, wherein:
(a) said rotatable cylinder (110) is provided with hole (136) means at the upper end thereof for the insertion of a locking member (137) to prevent a sliding longitudinal movement of the locking cylinder (100) relative to the rotatable cylinder (110).

3. A ball valve as defined in claim 2, wherein:
(a) a right angular longitudinal slot (154) is formed in an inner surface of the locking cylinder (100), and, a right angle corner (156) on the control lever (56) slidably engages the right angular longitudinal slot (154) in the locking cylinder (100) to restrict rotational movement of the locking cylinder (100) relative to the rotatable cylinder (110).

4. A ball valve as defined in claim 3, wherein:
(a) the locking cylinder (100) is provided with a cam surface (146) on the lower end thereof adjacent the valve body (10) and which cam surface (146) engages the top end of at least a first one (140) of the stop protrusions on the valve body (10) when the valve ball element (22) is in the valve open position; and, (b) a longitudinally extended stop finger (148) is formed on the locking cylinder (100) at one end of said cam surface (146), whereby when the control lever (56) moves the ball element (22) from a valve open position to a valve closed position, the cam surface (146) slides on the top end of said at least a first one (140) of said stop protrusions on the valve body (10) and allows rotation of the locking cylinder (100) until the depending lip (94) on the control lever (56) has moved from engagement with one side of said at least first one (140) of said stop protrusions into engagement with an adjacent side of a second one (142a) of said stop protrusions on the valve body (10) that is annularly spaced apart from said at least first one (140) of said stop protrusions and stops the rotation of the control lever (56), at which point the cam surface (146) on the locking cylinder (100) slides off of the top end of said at least first one of said (140) stop protrusions on the valve body (10), and the spring means (102) biases the locking cylinder (100) downwardly, to slide the longitudinally extended stop finger (148) into engagement with said one side of said at least first one (140) of said stop protrusions on the valve body (10), to put the valve ball element (22) into a positive, locked against rotation, closed position with said control lever (56) depending lip (94) and said locking cylinder (100) stop finger (148) engaging annular adjacent sides of said two annular spaced apart adjacent stop protrusions (142a,140) on the valve body (10).

5. A ball valve as defined in claim 4, wherein:
(a) said spring means (102) comprises a coil spring operatively mounted between the rotatable cylinder (110) and the locking cylinder (100).

* * * * *